United States Patent [19]

Georget et al.

[11] Patent Number: 5,120,277
[45] Date of Patent: Jun. 9, 1992

[54] TENSIONER FOR A TRANSMISSION BELT

[75] Inventors: Pierre Georget, Chambray les Tours; Christophe Rousseau, Tours; Marcel Verdier, Joué-Lès-Tours, all of France

[73] Assignee: Hutchinson, Paris, France

[21] Appl. No.: 545,601

[22] Filed: Jun. 29, 1990

[30] Foreign Application Priority Data

Jul. 6, 1989 [FR] France ............................ 89 09099
Apr. 10, 1990 [FR] France ............................ 90 04575

[51] Int. Cl.⁵ ..................................... F16H 7/08
[52] U.S. Cl. ............................ 474/117; 474/138
[58] Field of Search ................. 474/101, 109-111, 474/113-117, 133, 135, 136, 138

[56] References Cited

U.S. PATENT DOCUMENTS

| 2,038,968 | 4/1936 | Summers | 248/7 |
| 4,773,892 | 9/1988 | Zarife et al. | 474/138 |
| 4,790,801 | 12/1988 | Schmidt et al. | 474/138 X |

FOREIGN PATENT DOCUMENTS

| 045497 | 10/1982 | European Pat. Off. |
| 8303700 | 10/1983 | European Pat. Off. |
| 243237 | 10/1987 | European Pat. Off. |
| 291254 | 11/1988 | European Pat. Off. |
| 8901098 | 2/1989 | Fed. Rep. of Germany |
| 617246 | 2/1927 | France |
| 2393984 | 6/1977 | France |
| 61184238 | 1/1987 | Japan |
| 2208130 | 3/1989 | United Kingdom |

Primary Examiner—Thuy M. Bui
Attorney, Agent, or Firm—Berman, Aisenberg & Platt

[57] ABSTRACT

A tensioner for a power transmission belt is disclosed comprising a return spring associated mechanically with a tensioner roller with which the belt cooperates for controlling the movement of said roller under the action of said spring, wherein the vibrations likely to arise in the belt are damped by a rubber sheath integral with said spring for forming a chamber closed at its ends by seals, one at least of which has a nozzle for the inlet and/or outlet of air into and/or out of the chamber defined by said sheath and said seals.

17 Claims, 4 Drawing Sheets

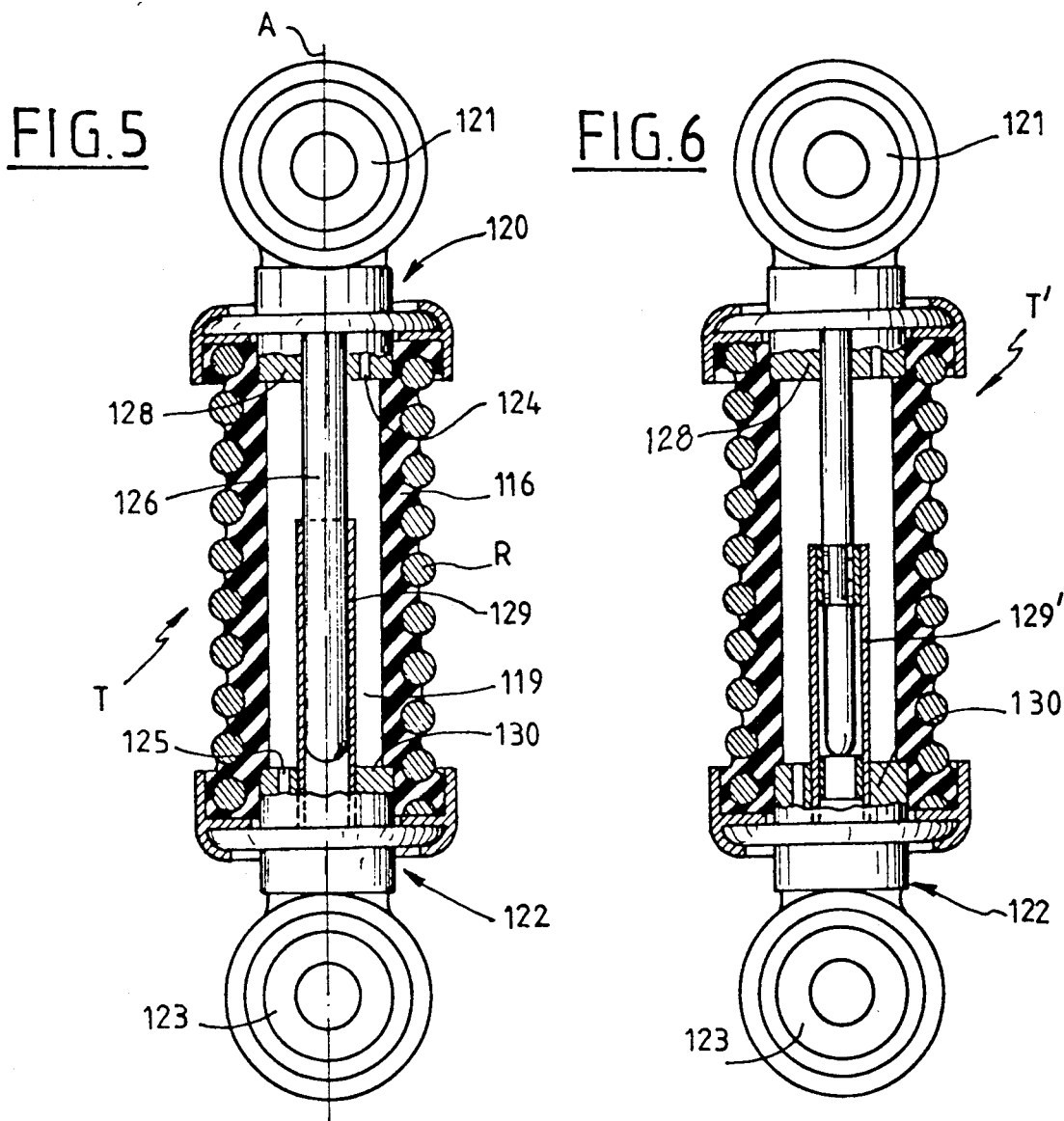

TENSIONER FOR A TRANSMISSION BELT

BACKGROUND OF THE INVENTION

The invention relates to a tensioner for a power transmission belt.

A system for power belt transmission from one shaft to another requires the presence of a belt tensioner so as to obtain satisfactory operation and, consequently, numerous tensioner devices have been proposed comprising a metal spring and means for damping the vibrations generated in the belt by the cyclic irregularities of the engine speed.

Although such devices, known for example from US-A-4 525 152 or WO 83/00731 or EP-A1-0243237 in the name of the Applicant give satisfaction, they are generally of a complex structure, so of considerable price and size.

Consequently, a general object of the invention is to provide a tensioner for a power transmission belt with a particularly simple structure, which may thus be manufactured under good economic conditions and which furthermore, because of its small size, is particularly appropriate for use in the automobile industry where, as is known, the available space under the engine hood is reduced.

It is also an object of the invention to provide a device which has a wide range of use whatever the characteristics of the spring used, in particular a spring having mechanical and geometric characteristics such that a risk of buckling results therefrom.

SUMMARY OF THE INVENTION

A tensioner for a power transmission belt in accordance with the invention, comprising a return spring associated mechanically with a tensioner roller with which the belt cooperates for controlling the movement of said roller under the action of said spring is characterized in that the vibrations likely to arise in the belt are damped by means of a rubber sheath integral with said spring for forming a chamber closed at its ends by seals, one at least of which has a nozzle for the inlet and/or outlet of air into and/or out of the chamber defined by said sheath and said seals.

In a preferred embodiment of the invention, the spring of the device is a helical coil spring working under compression, secured by adherence to the external face of the rubber sheath of a general cylindrical shape introducing the damping effect, the end seals defining longitudinally the chamber formed by the sheath being sealingly crimped thereon.

In one embodiment of the invention, with the nozzle formed in one at least of the seals of the sheath is associated a device introducing a pressure loss for complementarily modulating the damping effect.

In a preferred example of such an embodiment, the device introducing a pressure loss is a valve, a sintered metal plug or similar member.

In an advantageous embodiment of the device of the invention, it comprises, for fitting into a belt power transmission system, a first eye integral with one of the end seals of the chamber and a second eye integral with the other seal with which a member cooperates of the pivotally mounted lever type and which carries said roller cooperating with the transmission belt.

The material forming the rubber sheath is chosen as a function of the desired damping characteristics, on the one hand, and on the conditions of the environment of use, on the other : it is advantageously chosen from at least one of the elements of the following elastomer families:

| | | |
|---|---|---|
| N.R. | CSM | Epichlorhydrine C.O. |
| SBR | CR | Epichlorhydrine E.C.O. |
| BR | NBRPVC | Chlorated P.E |
| C.R. | IR | Chlorosulfonated P.E. |
| HNBR | I.I.R. | Fluorated elastomer |
| NBR | Bromobutyl | Polysulfurated rubber |
| EPDM | Chlorobutyl | Polyacrylic rubber |
| EPR | Ethylene acrylic elastomer | |
| P.U. | PTFE | |
| Silicon elastomers. | FPM | |

In a particularly preferred embodiment, inside the elastomer sheath defining the chamber of the tensioner, means are provided for guiding the ends of said chamber, with respect to each other, during their relative movement.

In one embodiment, these guide means are formed by a rod and tube assembly fixed to one and other of the two seals, respectively, the materials forming the rod and tube being chosen from steels or other iron based alloys, aluminium and its alloys, copper and its alloys, tin and its alloys, lead and its alloys.

In a preferred embodiment, the materials of the rod and tube are steels of a hardness equal to or greater than 60 HRC (ROCKWELL hardness).

According to another characteristic of the invention, the tube and the rod are made from the same material.

In a variant, the tube and the rod are made from different materials.

Whatever the embodiment, the invention in addition provides for lubricating the members guiding the ends of the chamber of the tensioner, most simply by means of an oil chosen from the usual oils for lubricating mechanical parts or from greases of the type used for ball bearings.

In a variant, the invention provides for the guide members to be of the self-lubricating type.

In one embodiment of the invention, it is further envisaged to use the guide members for imposing a pre-stress on the spring used, with the help of latching means preventing the spring from taking all the extension which would otherwise be possible.

BRIEF DESCRIPTION OF THE DRAWINGS

The invention will be well understood from the following description, given by way of example, and with reference to the accompanying drawings in which:

FIG. 5 is a schematic elevational view with parts cut away of a device according to the invention for another embodiment;

FIG. 6 is a view similar to that of FIG. 5, but for another embodiment;

FIGS. 7A, 7B and 7C are detail views of the embodiment illustrated in FIG. 6.

DESCRIPTION OF THE PREFERRED EMBODIMENTS

Figure 1:
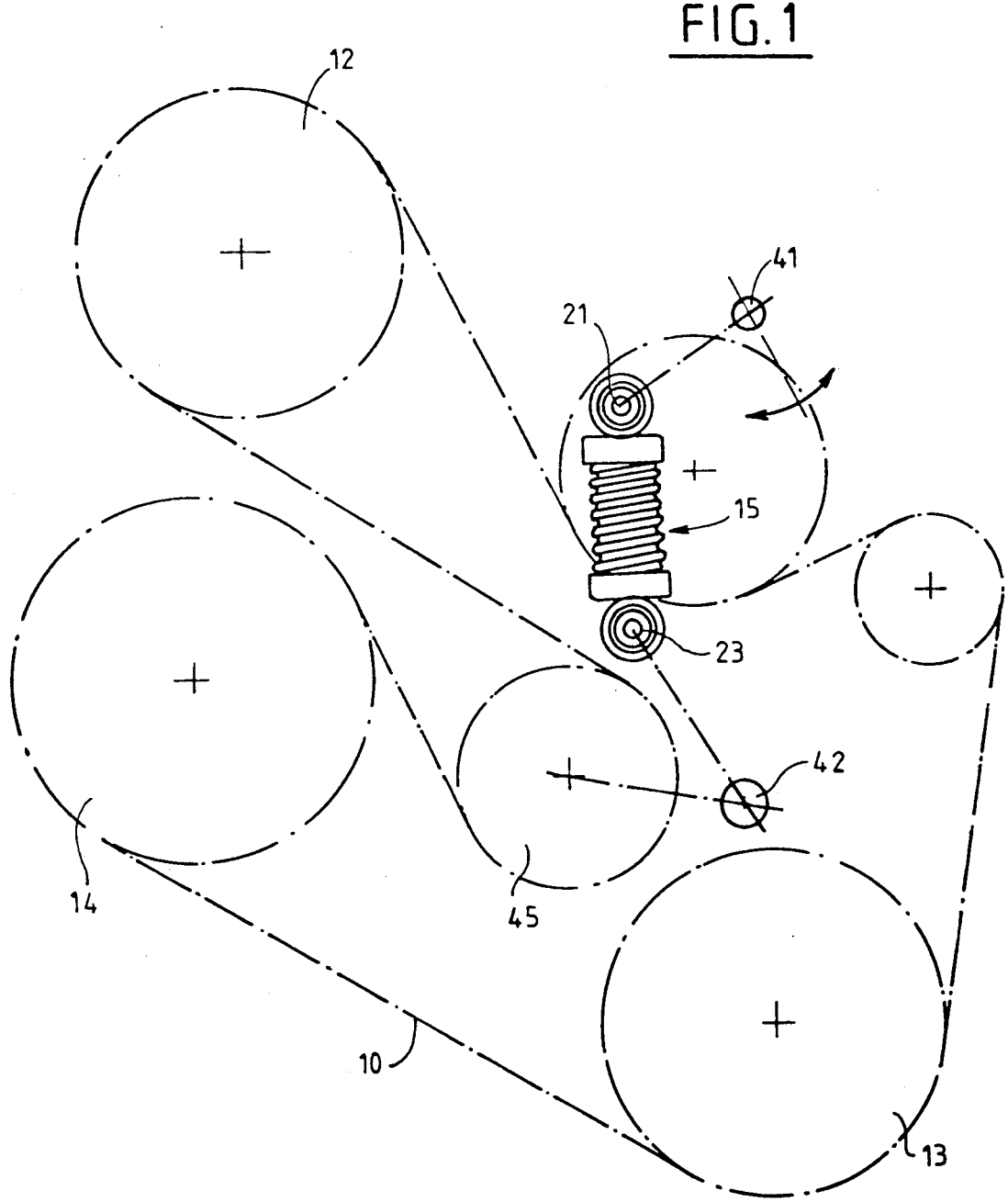
FIG. 1 is a schematic view of a belt transmission system.

Referring first of all to FIG. 1 which illustrates very schematically a power transmission system in which a belt 10 cooperates with the flanges of pulleys such as 12 and 13, etc ... fixed for rotation with driven shafts and with the flanges of a pulley 14 fixed on a driving shaft 18, for example the crankshaft or the alternator shaft of a motor car, truck, agricultural machine or similar engine. To provide the tension of belt 10, a tensioner is associated with the system for taking up its extension so as to avoid slipping of the belt with respect to the flanges of the pulleys and also to damp the vibrations generated in belt 10 by the cyclic irregularities of the engine speed, in particular when slow running or at the time of shocks occurring on start-up and/or stopping of the apparatus driven by the shafts fast with pulleys 12, 13, etc ...

In accordance with the invention, the tensioner 15 (FIGS. 2 and 3) comprises a coil spring R fast by adherence with a rubber sheath 16, for example a rubber chosen from at least one of the elastomers of the following elastomer families:

| | | |
|---|---|---|
| N.R. | CSM | Epichlorhydrine C.O. |
| SBR | CR | Epichlorhydrine E.C.O. |
| BR | NBRPVC | Chlorated P.E |
| C.R. | IR | Chlorosulfonated P.E. |
| HNBR | I.I.R. | Fluorated elastomer |
| NBR | Bromobutyl | Polysulfurated rubber |
| EPDM | Chlorobutyl | Polyacrylic rubber |
| EPR | Ethylene acrylic elastomer | |
| P.U. | PTFE | |
| Silicon elastomers. | FPM | |

Figure 4:
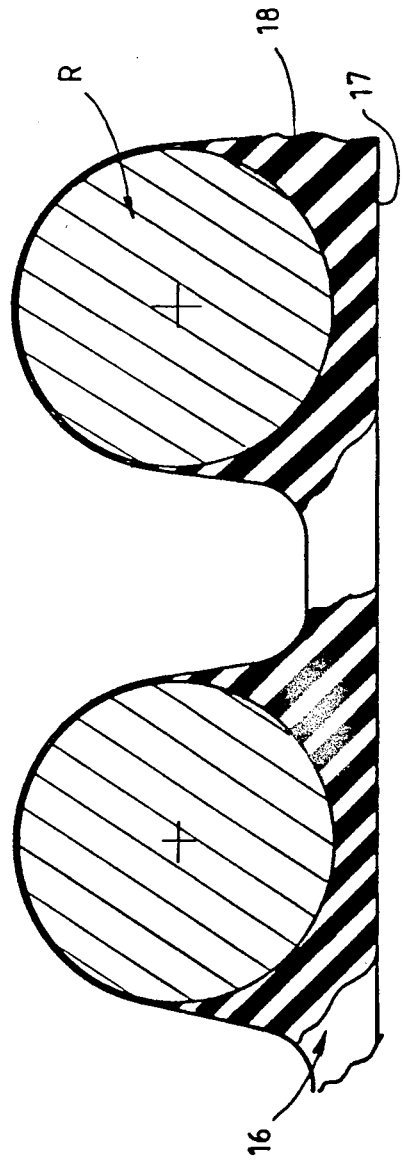
FIG. 4 is a partial view on a larger scale illustrating the adherence of a rubber sheath to the spring of the tensioner.

The cylindrical sealed sheath 16 adhering to spring R as shown in FIG. 4—i.e. somewhat after the manner of a "bellows" with smooth internal surface 17 and with "turns" 18 defined by a fine film on the external surface of the metal wire of the spring—defines an air filled chamber 19, closed at one of its ends by a seal 20 to which an eye 21 is fixed, whereas the other end is closed by a seal 22 on which is fixed an eye 23.

At least one of seals 20, 22 is pierced with a nozzle 24 or 25 for placing chamber 19 in communication with the atmosphere, said nozzle being advantageously provided with a member 26 introducing a pressure loss such as a valve or a sintered metal plug or a similar device, not shown.

For fixing seals 20 and 22 on sheath 16, in accordance with the invention they are shaped at their ends in the form of collars such as 30 and 31, crimped on the end turns of spring R and on the sheath by rings 34 and 35, respectively, with interpositioning of metal washers 36 and 37, respectively.

Figure 3:
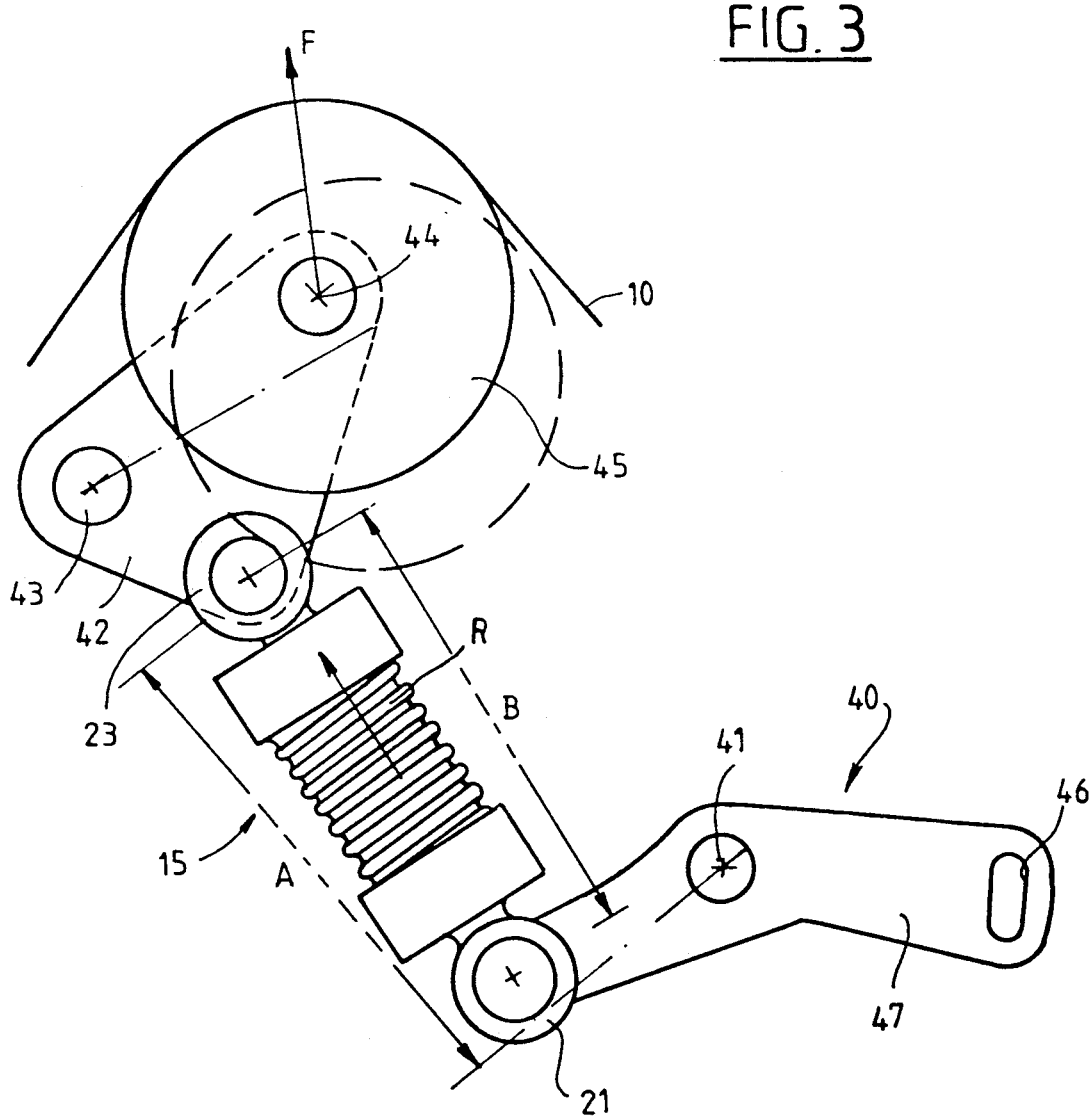
FIG. 3 is a schematic view illustrating the fitting of the tensioner in a system such as shown in FIG. 1.

The device which has just been described, in which the helical spring R works under compression and in which damping is adjusted by the shape, dimensions and characteristics of the material forming sheath 16 is implemented, in a preferred embodiment, by an assembly illustrated in FIG. 3. In this latter, the tensioner 15 is interposed between a first lever 40, mounted for pivoting about a shaft 41 and coupled to the tensioner 15 by the eye 21 of the latter whereas the other eye 23 is coupled to a second lever 42 in the form of a triangular plate mounted for pivoting about a shaft 43 and which has in the vicinity of its third angle (namely the one distinct from shaft 43 and the shaft for coupling eye 23), the shaft 44 of a roller 45 over which the belt 10 travels.

An elongate hole 46, at the end of arm 47 of lever 40 opposite that coupled to eye 21, allows the initial position of one end of the tensioner 15 to be adjusted whose length on fitting is illustrated in the drawings by the dimension A, whereas in the compressed condition of spring R, this dimension is reduced to that shown at B.

Figure 2:
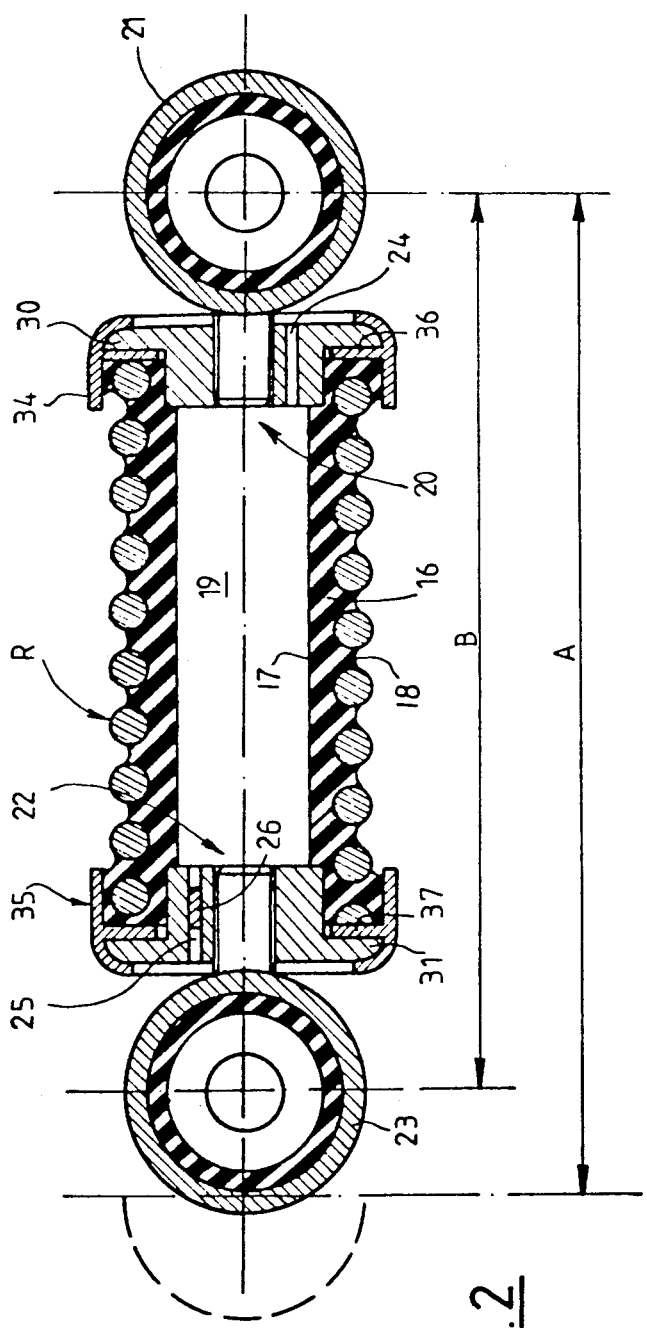
FIG. 2 is a longitudinal sectional view of a tensioner according to the invention.

To the mounted condition of the spring there corresponds for roller 45 the position shown with solid lines in FIGS. 2 and 3 whereas it is the position shown with broken lines which corresponds to that of the minimum length of the spring.

In one embodiment applied to a belt power transmission system used in a motor vehicle, good results have been obtained using a helical coil spring having in its mounted condition a pitch of about 7 mm, a diameter of about 12 mm and a radius of the metal spring wire of about 2 mm.

With such a spring, the rubber HNBR sheath 16 had an internal diameter of its surface 17 of about 6 to 14 mm whereas the length of the device on mounting was about 95 mm and a minimum length in the compressed state of the spring of about 80 mm. In the first condition, i.e. on fitting, the force F exerted by roller 45 on belt 10 had a value of about 220N whereas the corresponding force F in the condition of minimum length of the spring was about 800N.

Reference will now be made to FIG. 5 relative to another embodiment. In this embodiment, a rubber sheath 116 fast by adhering to a coil spring R defines an air filled chamber 119 closed at one of its ends by a seal 120 to which an eye 121 is fixed, whereas the other end is closed by a seal 122 to which an eye 123 is fixed. At least one of seals 120, 122 is pierced with a nozzle such as 124 and 125 for placing chamber 119 in communication with the atmosphere, said nozzle being advantageously provided with a member introducing a pressure loss, such as a valve or a sintered metal plug or similar device.

According to the invention, means are housed inside the elastomer sheath 116 for guiding the ends of chamber 119 with respect to each other during relative movement thereof. More precisely, with seal 120 is associated a rod 126, coaxial with the longitudinal axis A of the device, crimped or force fitted in body 128 of seal 120 and with seal 122 is associated a tube 129 fixed by crimping or force fitted in the body 130 of said seal.

The diameters of the rod 126 and of tube 129 are paired so that the rod and the tube may slide with respect to each other freely but without excessive play, rod 126 being housed over about half its length in tube 129.

The tube and the rod are advantageously made from a steel with a hardness equal to or greater than 50 HRC (ROCKWELL hardness) so as to avoid any untimely wear but other materials may of course be used, for example other iron based alloys or steels of different grades, alloys of aluminium, copper, tin, lead or these materials themselves.

The tube and the rod are preferably made from the same material, without however any limitation being attached to this indication, good results in so far as guiding is concerned being also obtained when the tube and rod are made from different materials.

As a function precisely of these materials, the invention provides for lubricating rod 126 and/or tube 129 by means of an oil used for lubricating translationally moving members or using a grease of the type used for ball bearings.

In a variant, the rod and the tube or liners which are associated therewith are made from self-lubricating materials, of the type known and used in slides or similar of usual machines.

Whatever the mechanical and geometric characteristics of spring R, the presence of the guide means which have just been described overcome any risk of buckling, notwithstanding the mode of working under compression of the tensioner.

The same result is obtained in the embodiment illustrated in FIGS. 6 and 7 where, however, the invention provides for using the guide members not only for overcoming any risk of buckling but also for imposing on spring R a pre-stress adapted to promote operation of the tensioner device under certain conditions of use. For this, tensioner T' identical to tensioner T of the preceding embodiment in so far as its general construction is concerned and where, consequently, the same parts bear the same references, is provided with a tube 129' and a rod 126' crimped or force fitted in body 130 of seal 122 and in the body 128 of seal 120, respectively. Tube 129' is fitted on the inside with two linings 140 and 141 separated from each other by a length d, FIG. 7A or, in a variant, is provided with a single liner having longitudinal apertures of length d. The internal diameter of this single lining pierced with apertures, where the internal diameter of the linings 140 and 141 corresponds to the external diameter of rod 126', has in line with a smaller diameter portion 142 two longitudinally directed spring blades 143 and 144. Said spring blades retracted in the condition shown in FIG. 7A make possible the free sliding of rod 126' in tube 129, in the direction of arrow F for pre-stressing the spring R, the value of such pre-stress being determined by the relative position of the rod and of the tube shown in FIG. 7B in which the spring blades 143 and 144 have escaped from lining 141. The working stroke is then that shown at c in FIG. 7C.

What is claimed is:

1. A tensioner for a power transmission belt comprising a return spring associated mechanically with a tensioner roller with which the belt cooperates for controlling the movement of said roller under the action of said spring, wherein the vibrations likely to arise in the belt are damped by means of an elastomer sheath integral with said spring for forming a chamber closed at its ends by seals, one at least of which has a nozzle for the inlet and/or outlet of air into and/or out of the chamber defined by said sheath and said seals.

2. The tensioner as claimed in claim 1, wherein the spring of the device is a helical coil spring working under compression, and secured by adherence to the external face of the elastomer sheath of a general cylindrical shape introducing the damping effect, the end seals defining longitudinally the chamber formed by the sheath being sealingly crimped thereon.

3. The tensioner as claimed in claim 2, wherein the cylindrical sealed sheath is adhered to the spring somewhat in the manner of a "bellows" with smooth internal surface and with "turns" defined by a fine film on the external surface of the metal wire of the spring.

4. The tensioner as claimed in claim 1 wherein, with the nozzle formed in one at least of the seals of the sheath is associated a device introducing a pressure loss for complementarily modulating the damping effect.

5. The tensioner as claimed in claim 4, wherein the device introducing a pressure loss is a valve, a sintered metal plug or similar member.

6. The tensioner as claimed in claim 1 comprising, for fitting into a power transmission system, a first eye integral with one of the end seals of the chamber and a second eye integral with the other seal with which a member cooperates of the pivotally mounted lever type and which carries said roller cooperating with the transmission belt.

7. The tensioner as claimed in claim 1 wherein the material forming the elastomer sheath is chosen as a function of the desired damping characteristics, on the one hand, and on the conditions of the environment of use, on the other preferably from at least one of the elements of the following elastomer families:

| | | |
|---|---|---|
| N.R. | CSM | Epichlorhydrine C.O. |
| SBR | CR | Epichlorhydrine E.C.O. |
| BR | NBRPVC | Chlorated P.E. |
| C.R. | IR | Chlorosulfonated P.E. |
| HNBR | I.I.R. | Fluorated elastomer |
| NBR | Bromobutyl | Polysulfurated rubber |
| EPDM | Chlorobutyl | Polyacrylic rubber |
| EPR | Ethylene acrylic elastomer | |
| P.U. | PTFE | |
| Silicon elastomers. | FPM | |

8. The tensioner as claimed in claim 1 comprising, inside the elastomer sheath defining the chamber, means for guiding the ends of said chamber, with respect to each other, during their relative movement.

9. The tensioner as claimed in claim 8, wherein the guide means are formed by a rod and tube assembly fixed to one and other of said seals, respectively, the materials forming the rod and tube being chosen from steels or other iron based alloys, aluminium and its alloys, copper and its alloys, tin and its alloys, lead and its alloys.

10. The tensioner as claimed in claim 9, wherein the materials forming the rod and tube are steels of a hardness equal to or greater than 60 HRC (ROCKWELL hardness).

11. The tensioner as claimed in claim 9, wherein the tube and the rod are made from the same material.

12. The tensioner as claimed in claim 9, wherein the tube and the rod are made from different materials.

13. The tensioner as claimed in claim 8 wherein the members guiding the ends of the chamber of the tensioner are lubricated by means of an oil chosen from the usual oils for lubricating mechanical parts or from greases of the type used for ball bearings.

14. The tensioner as claimed in claim 8 wherein the guide members are of the self-lubricating type.

15. The tensioner as claimed in claim 8 wherein the guide members are organized for pre-stressing the return spring.

16. A tensioner for a power transmission belt comprising a return spring associated mechanically with a tensioner roller with which the belt cooperates for controlling the movement of said roller under the action of said spring, wherein the vibrations likely to arise in the belt are damped by means of an elastomer sheath integral with said spring for forming a chamber closed at its ends by seals, one at least of which has a nozzle for the inlet and/or outlet of air into and/or out of the chamber defined by said sheath and said seals, wherein the chamber comprises means for guiding the ends of said chamber, with respect to each other, during their relative movement, wherein the guiding means comprises a rod and tube assembly arranged for prestressing the return spring and wherein the guiding means is provided with latching means disposed on the tube and rod, respectively, for preventing the spring from taking all the extension which would otherwise be possible.

17. The tensioner as claimed in claim 16, wherein said latching means comprise resilient spring blades fast with the rod and adapted for inserting themselves when opened out in the space separating two linings housed in the tube or in apertures of a single lining in said tube.

* * * * *